Jan. 17, 1950 H. W. PROTZELLER 2,495,077
APPARATUS FOR SERVING ICE CREAM
Filed Aug. 10, 1944 2 Sheets-Sheet 1
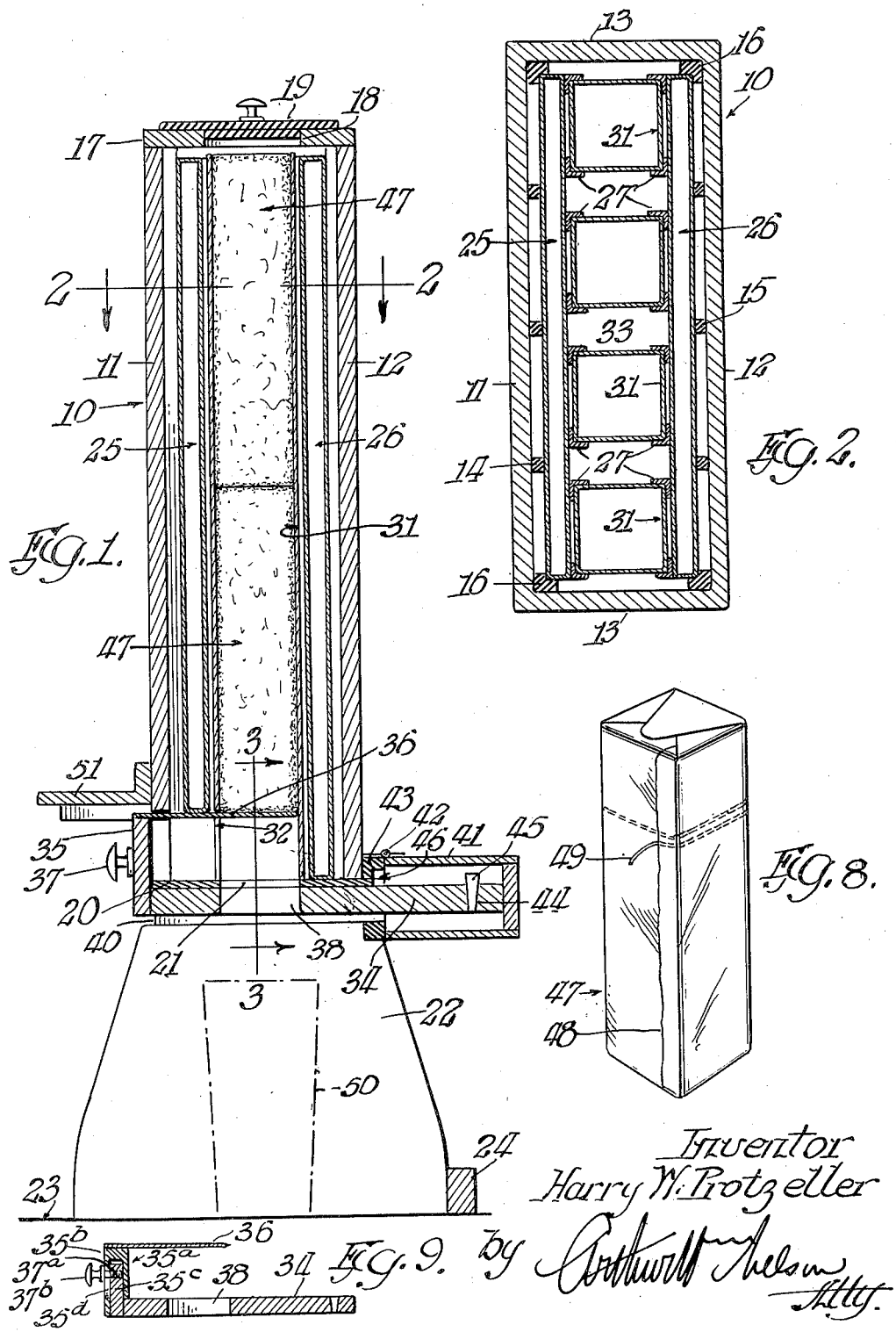

Jan. 17, 1950 H. W. PROTZELLER 2,495,077
APPARATUS FOR SERVING ICE CREAM
Filed Aug. 10, 1944 2 Sheets-Sheet 2
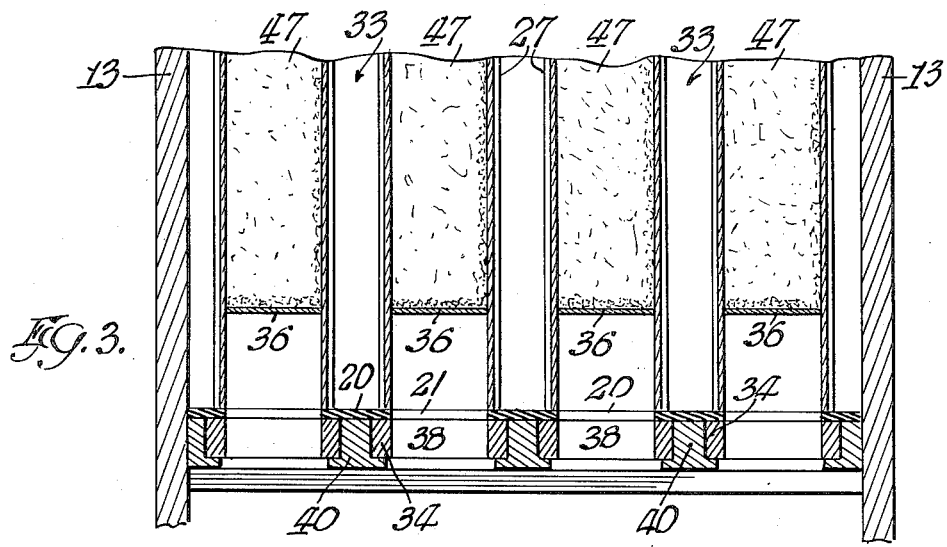
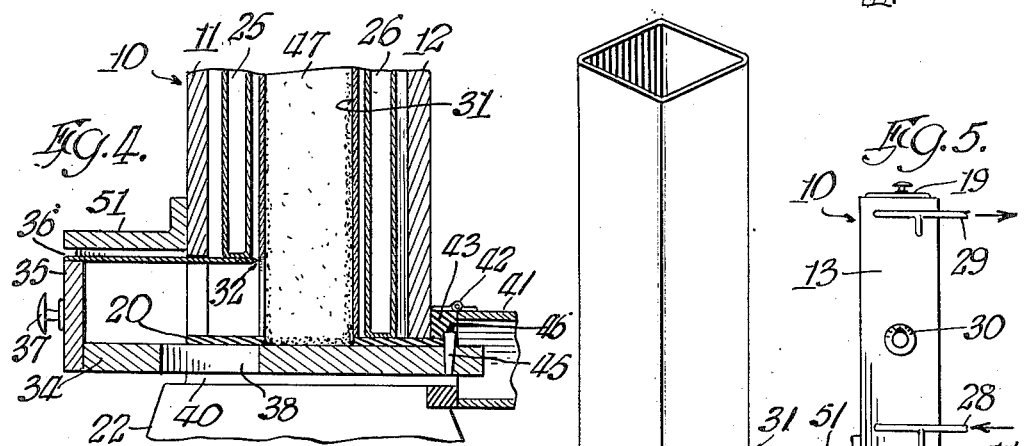
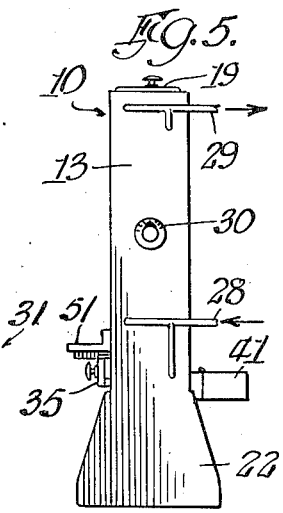
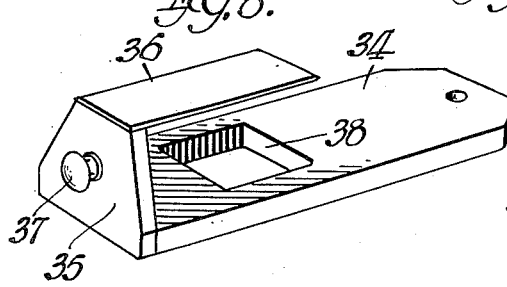
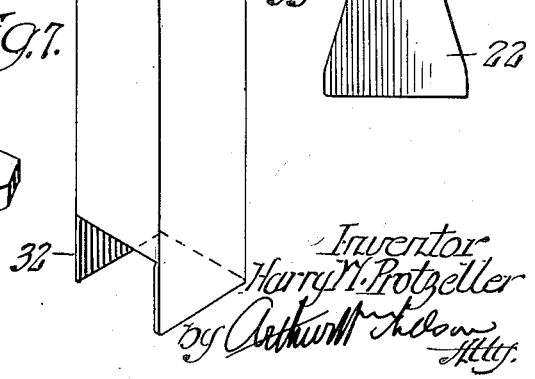

Patented Jan. 17, 1950

2,495,077

UNITED STATES PATENT OFFICE 2,495,077

APPARATUS FOR SERVING ICE CREAM

Harry W. Protzeller, Fairmont, Minn., assignor of one-half to Arthur Wm. Nelson, Park Ridge, Ill.

Application August 10, 1944, Serial No. 548,921

3 Claims. (Cl. 107—8)

This invention relates to improvements in apparatus for serving ice cream and it consists of the matters hereinafter described and more particularly pointed out in the appended claims.

One of the objects of the invention is to provide simple and efficient means for quickly serving uniform individual portions of ice cream from a source of supply.

Another object of the invention is to provide apparatus of this kind which will maintain the ice cream at that temperature providing the desired hardness for the ice cream between operations thereof for the intended purpose.

Also, it is an object of the invention to provide apparatus of this kind which may be readily taken apart for cleaning and sterilizing so as to maintain the same in a sanitary condition.

Furthermore, it is an object of the invention to provide apparatus of this kind which is inexpensive to manufacture, is easy to supply with ice cream and may be readily operated by inexperienced persons.

The above mentioned objects of the invention, as well as others, together with the advantages thereof will more fully appear as the specification proceeds.

In the drawing:

Fig. 1 is a vertical front to rear sectional view through an apparatus embodying the preferred form of the invention, with the parts thereof in the normal positions they occupy between uses for the intended purpose.

Fig. 2 is a horizontal sectional view through a part of the apparatus as taken on the line 2—2 of Fig. 1.

Fig. 3 is a transverse vertical sectional view through a portion of the apparatus as taken on the line 3—3 and on a scale enlarged over that of Fig. 1.

Fig. 4 is a fragmentary view of certain parts appearing in Fig. 1 with some of said parts in a position changed from that shown in Fig. 1.

Fig. 5 is a view in side elevation of the improved apparatus on a scale reduced from that of Fig. 1 and more particularly shows a piping arrangement for the cold plates of the apparatus, whereby it may be connected to suitable refrigerating apparatus.

Fig. 6 is a perspective view of one of the ice cream cut-off and serving devices embodied in the apparatus.

Fig. 7 is a perspective view of one of the ice cream bar storage tubes embodied in the apparatus.

Fig. 8 is a perspective view of one of the ice cream bars adapted to be divided into and served as individual portions by the apparatus.

Fig. 9 is a longitudinal vertical sectional view on a reduced scale through a modified form of ice cream cut-off and serving device which may be advantageously employed in the apparatus.

In general the improved apparatus includes an open top upright casing provided with legs for supporting the casing upon a counter, table or like surface with the bottom of the casing spaced above the same. Insertable into the casing through its open top, which is provided with a cover, is a plurality of laterally spaced ice cream bar storage tubes which are also spaced from the front and rear walls of the casing. These storage tubes, which are preferably made of a material to which ice cream will not adhere, are open at the top and bottom ends and said bottom ends of said tubes rest upon the bottom of the casing in line with an opening therein. As an example of a material to which ice cream will not adhere, a plastic known as "Formica" is mentioned.

In the space between said tubes and the front and rear walls of the casing are so-called hollow front and rear "cold plates," which in turn are so disposed as to be spaced from both the associated casing wall and side of the storage tubes, thereby affording channels for the circulation of air relative to the sides of the storage tubes. Thus the cold plates are adapted for a tubing connection with a suitable refrigerating apparatus and a thermostatic switch controls the temperature developed by said plates.

Associated with the bottom end of each storage tube is a device that is mounted for a front to rear guided movement with respect to the bottom of the casing. Each device includes a cut-off blade and a slide spaced below the same and in said slide is an opening, which when the device is in its normally "in" or rearward position, lines up with the bottom of the associated tube. The parts are so proportioned that when each device is in its "in" position, the blade thereof stands across the bottom of a tube and forms the bottom support for the ice cream bar in the associated tube. In serving a portion of the ice cream bar, the device is pulled forwardly to its "out" position and this withdraws the blade so that the bar gravitates downwardly past the same to engage upon the rear part of the slide, which has no opening therein. The device is then pushed inwardly and the blade cuts off a portion of the bar, which portion drops through the opening in the slide when the device is again in its "in" position to be received by a glass, dish, or other container placed on the supporting surface in line with said tube and opening.

Referring now in detail to that embodiment of the invention illustrated in the drawings, the improved apparatus includes an upright rectangular open top casing 10 having front and rear walls 11 and 12 and side walls 13—13 that include suitable insulating material. On the inner surface of said side walls is a plurality of laterally spaced batten strips 14 and 15. In each inside corner of the casing is a batten strip 16 of L shaped cross section.

The casing is provided with a top wall 17 in which is a transversely elongated opening 18 and associated therewith is a removable cover 19, as appears in Fig. 1. Said casing is provided with a bottom plate 20 in which is an opening 21, the purpose of which will appear later. At each side of the bottom of the casing is a leg or side plate 22 by which the casing as a whole may stand upright upon a supporting surface 23. The bottom ends of said legs or side plates are relatively wide, from front to rear, to form a stable base for the apparatus as a whole and are connected together at the rear by a cross bar 24.

25 and 26 indicate respectively the front and rear cold plates for the apparatus and which are secured in position against the respective batten strips 14—15 and corner strips 16 in any suitable manner. These cold plates are made in the form of flat hollow walls and on the inner surface of each plate are pairs of angle bar guides 27—27 best appearing in Fig. 2. Refrigerating medium is circulated through said plates from suitable apparatus (not shown) as by means of tubings 28 and 29 which pass through one of the side walls 13 of the casing. A suitable device 30 is mounted on said wall and is connected to the refrigerating apparatus so that it controls the temperature in the casing as provided by said plates 25—26. The parts just mentioned best appear in Fig. 5. As best appears in Fig. 1, the top ends of the cold plates 25 and 26 are disposed in the same plane and this plane is spaced slightly below the top plate 17 of the casing. The rear cold plate has a greater height than the front plate and the bottom end of the rear plate rests upon the bottom 20 of the casing while the bottom end of the front plate terminates in a plane above said bottom as appears in said Fig. 1 and is held against dropping by any suitable means.

31—31 indicate a plurality of upright, laterally spaced ice cream bar storage tubes disposed in the transverse medial line of the casing. Each tube, which preferably is made of a plastic material such as "Formica" to which ice cream will not adhere, is of a square cross section and rests at its bottom end upon the casing bottom 20 in line with an associated opening 21 therein. The top end of each tube extends into an elevation slightly below the top plate 17 of the casing. The front wall of each tube is cut away at its bottom as at 32 (in Fig. 7) up to the plane of the bottom edge of the front cold plate 25 as best appears in Fig. 1. Each tube is removably disposed within the confines of each pair of angle bar guides 27 on the cold plates 25—26 so that while the front and rear wall of each tube is spaced from the front and rear cold plates, each tube has a sliding guided engagement therewith whereby it may be withdrawn from and replaced within the casing through the opening 18 in the top plate 17.

It is to be noted from Fig. 2 that the storage tubes 31—31 when in position in the casing are separated by channels 33—33. With the arrangement described and with the cold plates spaced from the front and rear walls of the casing and from the front and rear walls of the tubes 31, a circulation of air is possible whereby each tube 31 is refrigerated from all four sides.

Associated with the bottom end of each storage tube is a combined ice cream bar cut off and delivery device best shown in perspective in Fig. 6. Each device comprises an elongated rectangular slide plate or bottom 34, an upright front plate 35 and a cut-off blade 36. On the front plate 35, which is of a height approximating the open front 32 of the bottom of the associated tube 31, is a nob 37 by which the device may be moved out from its normal "in" position into its "out" position and then returned to its "in" position, when so moved for its intended purpose.

The blade 36, which is also preferably made of a material to which ice cream will not readily adhere, is of such length that when the device is in said "in" position, said blade passes through the upper part of the opening 32 in the associated tube so as to have an edge engagement with the rear wall of the tube 31. In the front portion of the slide 34 is an opening 38 which, when the device is in its "in" position, lines up with the opening 21 in the bottom plate 20, as best appears in Fig. 1.

The slide 34 of each cut off and delivery device has sliding guided engagement with laterally spaced forwardly and rearwardly extending rails 40—40 that depend from the bottom 20 of the casing as best appears in Fig. 3.

The slide 34 of said device is of a length greater than the depth of the casing from front to rear so that when said devices are in the "in" position, the rear end of each slide 34 extends somewhat beyond the rear of the casing. To enclose said rear end parts I provide a housing 41 which is hinged as at 42 along its upper inner edge to a cross bar 43 fixed to and extending across the bottom end of the rear wall 12 of the casing. Centrally in the rear end of each slide 34 is an opening 44 removably to receive a pin 45 adapted to engage in a recess 46 in the bar 43 to limit the withdrawal of the device from its "in" to its "out" position.

The apparatus above described is adapted for serving uniform individual portions of ice cream of uniform size from a source of supply conveniently arranged in the form of a brick or bar such as shown in Fig. 8 and indicated as a whole by the numeral 47. Such a brick or bar is of a square cross section to fit within a storage tube 31 and preferably has a length about four times the dimension of its cross section. After being made in suitable moulds in an ice cream factory, it is enclosed in a moistureproof wrapper 48 provided toward one end with a tearing thread 49. The end portions of said wrapper are arranged in overlapping relation, and one end of the tearing thread exposed for grasping, as best shown in Fig. 8.

To load the storage tubes 31—31, the cover 19 is first removed to expose the upper open end of the storage tubes. Thereafter an ice cream bar 47, as shown in Fig. 8, is held in one hand and a pull is exerted upon the thread 49 to cut the wrapper 48 circumferentially. One end of the wrapper is then removed from the bar. This uncovered or unwrapped end is inserted into the top end of one of the storage tubes, at which time the remaining part of the wrapper is removed and the unwrapped bar then slides down its tube to engage upon the blade 36 of the cut-off and delivery device associated therewith and which device is now in its "in" position. Another bar 47 is unwrapped and is placed in the same tube, the tube being long enough to accommodate two of such bars. The bars in said tube are now supported upon the blade 36 of the cut-off and delivery device associated with that tube.

The other tubes are then loaded with ice cream bars of the desired flavor, in the way above described, after which the cover 19 is applied to close the top end of the casing.

To operate the apparatus, the knob 37 of the device associated with the storage tube containing the ice cream bar of the desired flavor is grasped and pulled outwardly until it is stopped in its "out" position, as shown in Fig. 4 by the engagement of the pin 45 in the recess 46 of the cross bar 43. In this position the blade 36 of said device has cleared the front side of the said tube and has disposed a solid part of the slide 34, rearwardly of the opening therein, in line with the bottom of the tube which, as before mentioned, lines up with the opening 21 in the bottom plate 20.

As the blade 36 clears the tube 31 in the withdrawal of the device, to its "out" position, the ice cream bars in the associated tube gravitate downwardly so that the bottom end of the bottom bar engages upon the slide 34 rearwardly of the opening 38 therein.

The device is now pushed inwardly, at which time the blade 36 thereof cuts through the bar, the slide 34 sliding rearwardly from under the end of the bar resting thereon. When the device has been pushed inwardly to the "in" position wherein the edge of the blade engages against the rear wall of the tube, the bar will have been severed and the severed portion falls through the opening 21 as well as through the opening 38 in the slide 34 into a container 50 such as indicated in dotted lines in Fig. 1.

In Fig. 9 I have illustrated a modified form of ice cream cut off and serving devices which is so constructed as to be adjustable to serve ice cream portions of different volumes or sizes.

Such a device includes the slide plate 34, blade 36 and front plate, which is indicated at 35a. This front plate is made of vertically telescopic parts 35b and 35c respectively so as to be adjustable in height. The part 35b is provided with a vertical slot 35d through which the threaded stem 37a of a knob 37b passes to have threaded engagement in the front plate part 35c. By moving the plate parts 35b and 35c relatively, the space between the blade 36 and the slide plate 34 may be adjusted for the desired volume or size of the portion to be cut from the ice cream bar and the parts may be operatively secured in the adjusted position by turning the knob 37b in the proper direction.

The device may be readily cleaned by removing the tubes through the open top of the casing and after pulling out the pins 45 from the rear end of the cut-off and delivery devices, they too may be removed and cleansed.

The device is of simple construction and therefore its cost is relatively low. It is easy to load, to use and to keep clean and it has few moving parts. The portions of ice cream that are served are all uniform in size and there is no waste in producing such portions.

Projecting from the front wall 11 of the casing, toward its bottom end is a canopy 51 which overhangs each cut off and delivery device when the same has been drawn into its "out" position as appears in Fig. 4.

While in describing the invention I have referred in detail to the form, arrangement and construction of the parts involved, the same is to be considered only in the illustrative sense so that I do not wish to be limited thereto except as may be specifically set forth in the appended claims.

I claim as my invention:

1. Ice cream serving apparatus embodying therein an upright casing having front and rear walls and side walls, means spaced inwardly from each front and rear wall and providing refrigeration in said casing, tubes disposed between said refrigerating means each to receive a bar of relatively solid ice cream for gravitational movement therein toward the bottom thereof, devices on said first mentioned means holding said tubes in lateral spaced relation, with air circulating channels therebetween that open at the top into the top of the casing, mechanism each associated with a tube and mounted on the casing for a forward and rearward movement thereon, said mechanism in its movement in one direction operating to sever a portion of the bar at the bottom of the associated tube and to discharge it from said apparatus.

2. Ice cream serving apparatus embodying therein a casing having front and rear walls and side walls, hollow cooling plates spaced inwardly from the front and rear walls respectively and forming a part of a refrigerating system, sets of vertical guide means on the opposed inner surfaces of said cooling plates, a plurality of storage tubes, one removably engaged in each set of guide means and each adapted to receive a bar of relatively hard ice cream for gravitational movement therein toward the bottom of the associated tube, said guide means being so arranged as to provide air circulating channels between said tubes that open at their top end into the top of the casing, and mechanisms each associated with the bottom end of a tube and mounted for a forward and rearward movement therein, said mechanisms in its movement in one direction operating to sever a portion of the bar in the associated tube and to discharge it from the apparatus.

3. Ice cream serving apparatus embodying therein a casing having front, rear and side walls, front and rear conduit means spaced inwardly from said front and rear walls and providing for the circulation of a refrigerant therethrough, commodity receiving tubes having two pairs of sides arranged between said front and rear conduit means, and means on said front and rear conduit means in which said tubes are removably engaged for spacing the tubes from each other thereby forming refrigerated air spaces between them and whereby two opposed sides are disposed in heat transfer relationship to said front and rear conduits and the other two sides thereof are disposed in heat transfer relationship to a pair of said air spaces.

HARRY W. PROTZELLER.

REFERENCES CITED

The following references are of record in the file of this patent:

UNITED STATES PATENTS

| Number | Name | Date |
|---|---|---|
| 1,334,304 | Hodgdon et al. | Mar. 23, 1920 |
| 1,342,675 | Hix | June 8, 1920 |
| 1,616,836 | Watts | Feb. 8, 1927 |
| 1,642,200 | Hall | Sept. 13, 1927 |
| 1,783,222 | Collins et al. | Dec. 2, 1930 |
| 2,039,395 | Dalton et al. | May 5, 1936 |
| 2,076,922 | Simard | Apr. 13, 1937 |
| 2,148,451 | Elliott | Feb. 28, 1939 |